United States Patent
Remtulla et al.

(10) Patent No.: US 9,842,303 B2
(45) Date of Patent: Dec. 12, 2017

(54) METHOD FOR COUPLING QUALITY CONTROL DATA OF A SUBASSEMBLY OF COMPONENTS TO A MAIN PRODUCT ASSEMBLY

(71) Applicant: Toyota Motor Engineering & Manufacturing North America, Inc., Erlanger, KY (US)

(72) Inventors: Shain Remtulla, Brampton (CA); Elias Simon Joseph, Saltillo, MS (US); Edmund Tai, Woodstock (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 709 days.

(21) Appl. No.: 14/197,475

(22) Filed: Mar. 5, 2014

(65) Prior Publication Data
US 2015/0254582 A1 Sep. 10, 2015

(51) Int. Cl.
*G06F 19/00* (2011.01)
*G06Q 10/06* (2012.01)
*G06K 1/12* (2006.01)
*G05B 19/418* (2006.01)

(52) U.S. Cl.
CPC ..... *G06Q 10/063* (2013.01); *G05B 19/41875* (2013.01); *G06K 1/121* (2013.01)

(58) Field of Classification Search
CPC .................................................. G05B 19/41875
USPC .................... 702/84; 700/109, 110, 115, 116
See application file for complete search history.

(56) References Cited

U.S. PATENT DOCUMENTS

| 6,381,509 | B1* | 4/2002 | Thiel | G06Q 10/06 382/282 |
| 6,732,005 | B1 | 5/2004 | Bobkin et al. | |
| 6,909,927 | B2* | 6/2005 | Nguyen | G05B 23/0281 700/110 |
| 6,988,314 | B2 | 1/2006 | Kobayakawa | |
| 7,320,205 | B2 | 1/2008 | Cooper et al. | |
| 2004/0225390 | A1* | 11/2004 | Keller | G06Q 10/06 700/95 |
| 2005/0071032 | A1* | 3/2005 | Urabe | G05B 19/128 700/109 |
| 2008/0103622 | A1* | 5/2008 | Hanses | G05B 19/4183 700/116 |
| 2010/0001063 | A1* | 1/2010 | Bowles | G06Q 20/20 235/380 |
| 2010/0256793 | A1* | 10/2010 | Lee | G05B 19/41875 700/108 |

\* cited by examiner

*Primary Examiner* — Leslie J Evanisko
(74) *Attorney, Agent, or Firm* — Christopher G. Darrow; Darrow Mustafa PC

(57) ABSTRACT

A method and apparatus couples quality control data generated during the manufacture of a subassembly of components with at least a unique main product assembly identification number and the quality control data of the main product at the time of installation of a subassembly to the main product assembly. The subassembly quality control data and the main product assembly quality control data and unique product identification are stored.

18 Claims, 3 Drawing Sheets

METHOD FOR COUPLING QUALITY CONTROL DATA OF A SUBASSEMBLY OF COMPONENTS TO A MAIN PRODUCT ASSEMBLY

BACKGROUND

The present quality information apparatus and method relates, in general to apparatus and method which track and store quality control information generated during the manufacture of a product.

In manufacturing operations, numerous parts or components are joined together into sub-assemblies that are in turn added to other sub-assemblies to complete a final assembly of an article, such as an automobile or vehicle.

Current quality standards require that all quality data, such as time and date of manufacturer, operator ID, torque data, process complete, process stops, retries, etc., for each part of an overall complete assembly be recorded. In certain assembly operations, particularly vehicle assembly operations, sub-assemblies are manufactured in an offline area separate from the main vehicle assembly line. While quality data can be acquired for each subassembly, the sub-assemblies are typically transferred to the main assembly line in a batch, such as in a container of like sub-assemblies or via a conveyor or other transfer device in a consecutive fashion.

Previously, there has been no way to link the quality data of a subassembly built offline from a main assembly line with the quality data of the final product assembly to which subassembly is subsequently joined.

SUMMARY

A method for coupling quality control data of a subassembly of components separately manufactured from a main product assembly and randomly selected for subsequent addition to the main product assembly having main product assembly quality control data and a unique main product assembly identification includes generating quality control data associated with the assembly of each subassembly, determining if the generated quality control data for each subassembly matches quality control standards; printing the quality control data of each subassembly and/or a unique subassembly ID in a barcode upon a two dimensional document, attaching the two dimensional document carrying the barcode to the subassembly, at the time of installation of the subassembly to the main product assembly, reading the barcode on the document attached to the subassembly, and coupling, by a controller, the quality control data associated with the subassembly with the quality control data and the unique identification of the main product assembly.

In the case of the main product assembly being a vehicle, the method couples the quality control data of the subassembly with a vehicle identification number.

If the subassembly quality control data does not match quality standards, the method allows a bypass operation for retrying at least one subassembly operation. The bypass operation includes the reading of an identification of a person authorized to bypass operation. The identification of the authorized person is recorded with quality control data associated with the retried operation on the subassembly to associate the bypass event with the quality control data of the subassembly.

The barcode can be a two dimensional barcode.

Where the subassembly includes at least one fastener, if the fastener assembly operation does not meet quality control standards, retrying assembly of the fastener is allowed only once.

An apparatus is disclosed for associating quality control data associated with a subassembly with quality control data and a unique main product assembly identification when the subassembly is installed in the main product assembly includes using a computer executing a control program and receiving inputs and generating outputs which record quality control information generated during the assembly of the subassembly. Compare the quality control data of the assembly of the sub-assembly with the quality control standards, print a two dimensional barcode on a two dimensional document, where the barcode contains the quality control information associated with one subassembly, read the barcode on the subassembly at the time of installation of the subassembly in the main product assembly, associating the quality control data of the subassembly with the unique main product assembly identification, and storing the coupled subassembly quality control data with the main assembly identification.

BRIEF DESCRIPTION OF THE DRAWINGS

The various features, advantages and other uses of the presently described quality control apparatus and method will become more apparent by referring to the following detailed description and drawing in which.

DETAILED DESCRIPTION

The subsequently described quality control apparatus and method is suited for use in a manufacturing operation where at least one subassembly, itself formed of one or more components joined together are subsequently joined to or added to a product on a main assembly line.

Figure 1:
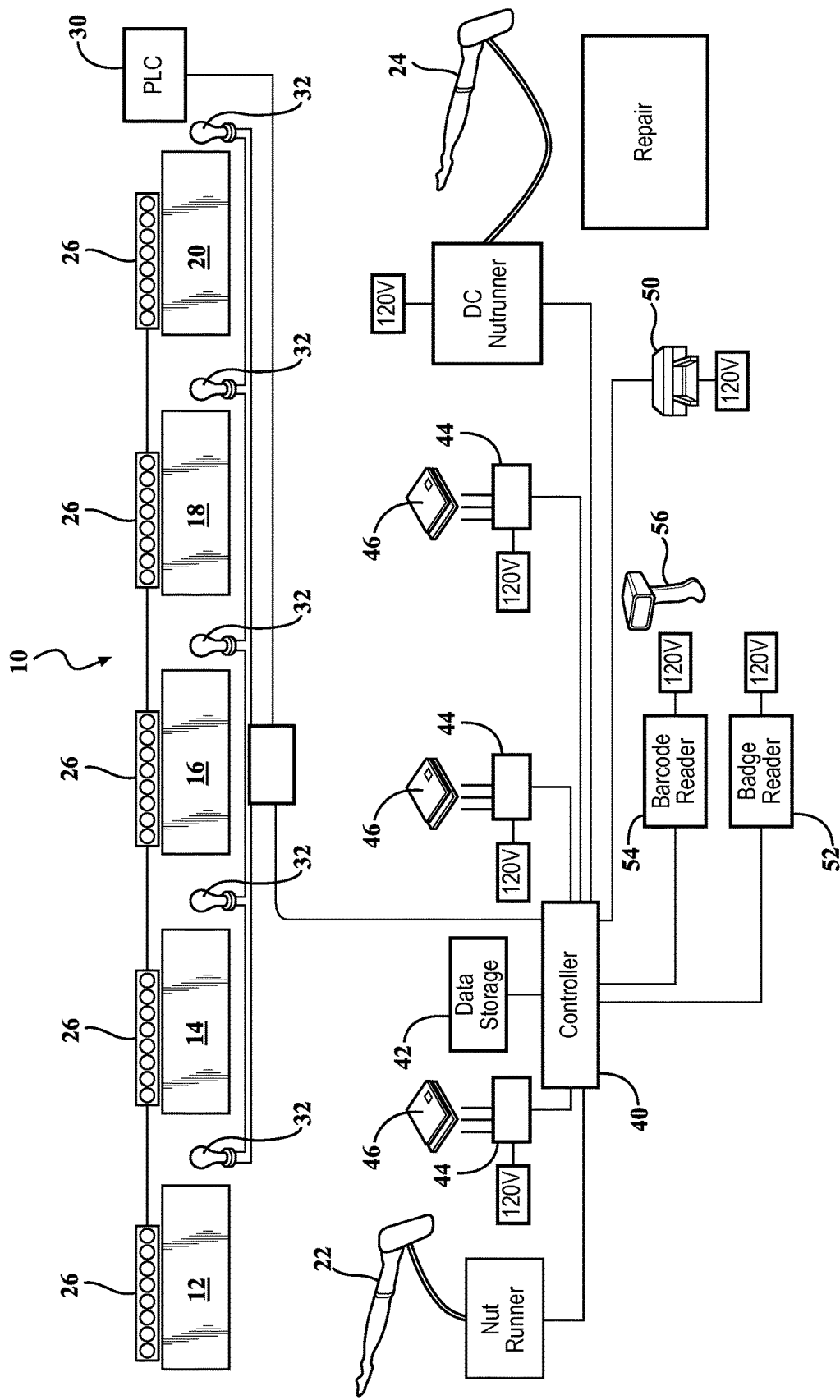
FIG. 1 is a schematic diagram of an example of a subassembly manufacturing operation with quality control collection and recordation.

An example of a subassembly operation which can use the quality control apparatus and method described hereafter is shown in FIG. 1. By example, a subassembly operation 10 includes a plurality with five stations 12, 14, 16, 18 and 20 shown by example only. The stations 12, 14, 16, 18 and 20 consecutively add components or perform operations on previously added components in the subassembly. In addition, by example, one or more of the stations 12, 14, 16, 18, and 20 may include a nutrunner, such as nutrunners 22 and 24. Each nutrunner 22 and 24 employs a set of sockets 26 to tighten fasteners, such as screws, nuts, bolts etc., used to join the various components of the subassembly together. Other fastening or joining apparatus may also be employed to complete the subassembly. For example, any one of the stations 14, 16, 18 and 20 may simply perform the operation of adding a component to the partially completed subassembly with the more permanent joining of the component to the subassembly taking place in the next stations 12, 14, 16, 18 or 20.

The stations 12, 14, 16, 18 and 20 are coupled by a controller PLC 30 which controls individual lights 32 associated with each station 12, 14, 16, 18 and 20 which provide a go or no go signal to advance the subassembly through stations 12, 14, 16, 18, and 20. The controller 30 is processor based and accesses a control program stored in memory and receives inputs from each station 12, 14, 16, 18 and 20 to indicate the successful completion of the work operation at each station 12, 14, 16, 18 or 20. The absence of a signal from the operator or automatic sensing equipment at each station 12, 14, 16, 18, and 20 is interpreted by the controller 30 as a no go signal thereby not allowing the subassembly to advance from one or more particular stations 12, 14, 16, 18 and 20.

The controller 30 communicates with an area wide controller 40, also processor based and accessing a data storage 42. The controller 40 may also be a programmable logic controller (PLC). Visual monitors 46 run by controllers 44 are provided throughout the subassembly area 10 to provide an indication of the status of the operation at each station 12, 14, 16, 18, and 20 and/or to provide assembly information to the workers. The controller 40, also receives outputs from the nutrunners 22 and 24 to store in the data storage 42 various quality control information, such as the torque, number of tries or retries of each fastener driven by either one of the nutrunners 22 and 24, a subassembly ID, or number, time and date of assembly, operator ID or any other information required for quality control purposes.

Figure 3:
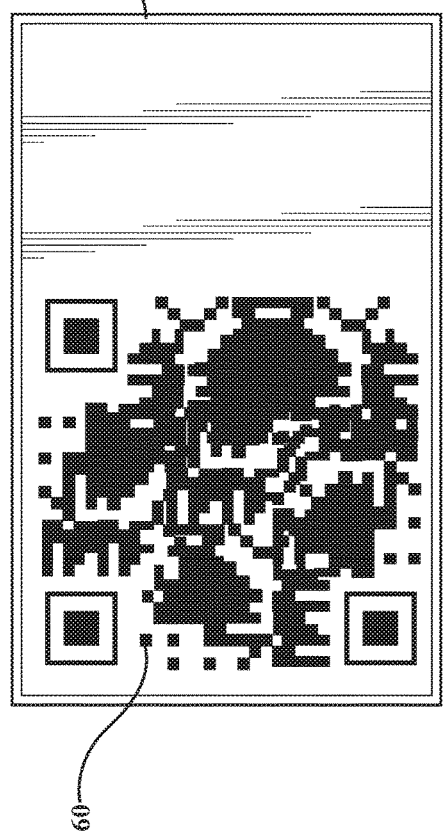
FIG. 3 is a pictorial representation of a bar code employed in the quality control apparatus and method.

The controller 40 also generates signals to a two dimensional printer 50 and receives inputs from a badge reader 52 and a barcode reader 54. The printer 50 is suitable for printing a barcode 60, shown in FIG. 3, on two-dimensional document 62, such as a peel off, stickable paper that can be physically attached to the subassembly when the subassembly completes the subassembly operation. The barcode 60 contains all the required quality control information for the subassembly generated and supplied to the controller 40 during the complete multi-station assembly of the subassembly. The barcode reader 54 is used as an input to the controller 40 and the printer 50 serves as a device for reprinting the barcode 60 on a new document 62 in the event that document 62 is lost, becomes separated from a subassembly or is otherwise damaged. A barcode scanner 56 is coupled to the barcode reader 54 to scan whatever portion or part of the barcode 60 on a particular subassembly is available so that the controller 40 can reprint a new document 62 with the appropriate barcode 60 information.

The badge reader 52 is also coupled as an input to the controller 40. The badge reader 52 enables the identification of an authorized person or worker associated with the subassembly area 10 to input his or her identification, such as an ID on a badge carried by the authorized person, to the controller 40. The purpose of the input of the badge information by an authorized person will become more apparent in the following description.

Figure 4:
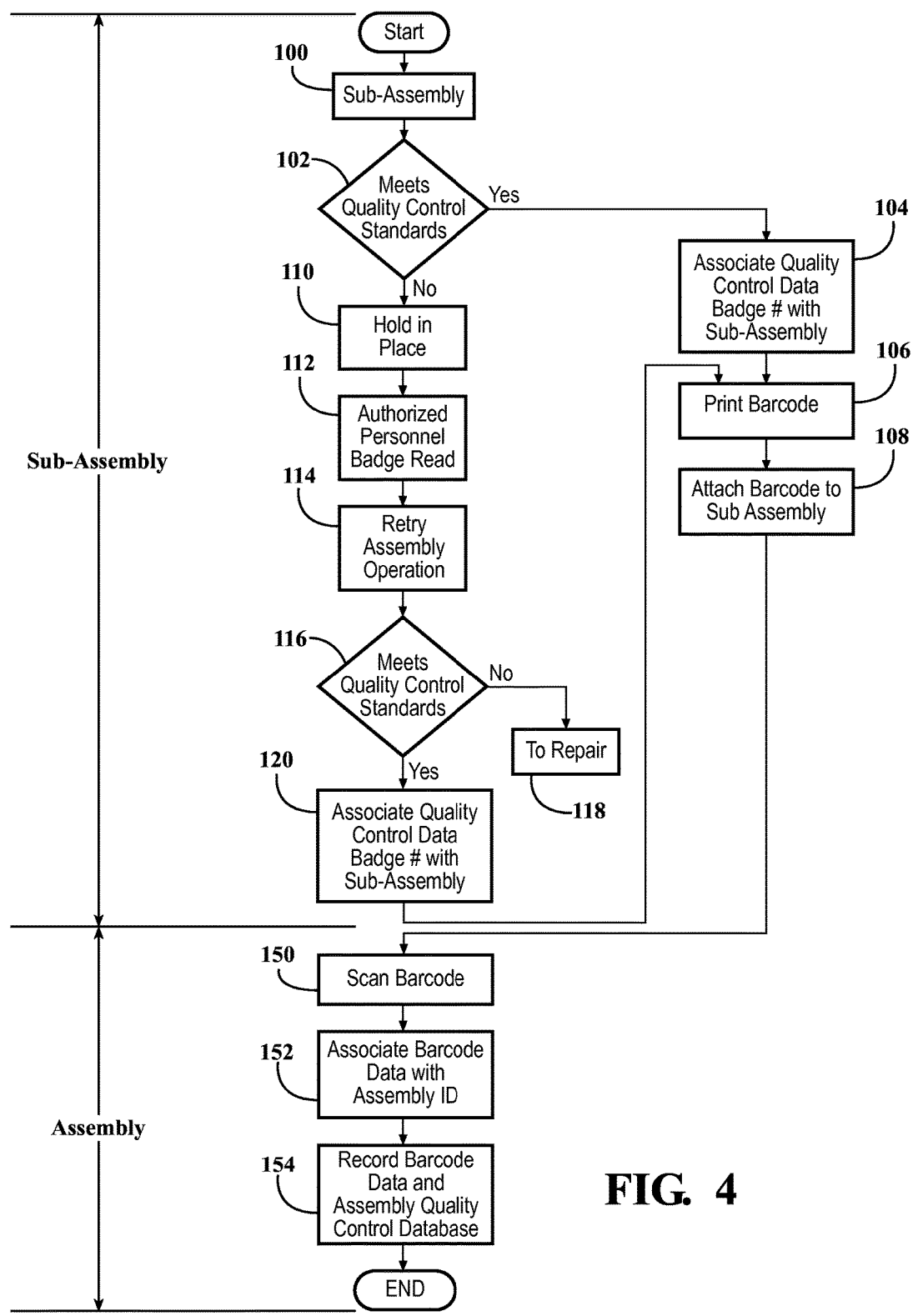
FIG. 4 is a flow diagram depicting a sequence of operation of the quality control apparatus and method.

Referring now to FIG. 4, there is depicted a flow chart depicting the operation of the controller 40. In step 100, a new subassembly is started in station 12 and progresses through each subsequent station 14, 16, 18 and 20 as long as the subassembly meets all quality control standards, as determined in step 102, in each station 12, 14, 16, 18 or 20. In the event that the subassembly as it progresses through each station 12, 14, 16, 18, and 20 meets all quality control standards in step 102, the controller 40 associates the quality control data acquired for that particular subassembly with a unique subassembly ID or number in step 104. The subassembly number may be randomly assigned or be consecutive for each successive subassembly completed in the subassembly area 10. In this manner, the quality control data, such as time and place of manufacture, fastener torque, the number of fastener retry operations, etc., is associated with the subassembly number. The controller 40 then generates the barcode 60 on the document 62 by printer 50 in step 106. The document 62 in step 108 is then physically attached by a worker to the completed subassembly. Such attachment may be an adhesive, or by other removable attachment, to allow the document 62 to be removed from the subassembly when the subassembly is installed on the main product in the main assembly line as described hereafter and shown in FIG. 3.

In the event that the subassembly, as it progresses through the work stations 12, 14, 16, 18 and 20, fails to meet a particular quality control standard in any of the stations 12, 14, 16, 18 and 20, the controller 30 generates a hold in place action in step 110 which holds the particular subassembly in a particular work station 12, 14, 16, 18 and 20, such as by maintaining mechanical holding or clamping devices in a locked state. An authorized person associated with the subassembly area 10 or a worker authorized to take corrective action, inputs his/her batch number to the controller 40 in step 112 via the badge reader 52. Once authenticated by the controller 40, a particular manufacturing step may be retried in step 114. This could constitute, for example, a new fastener added to the subassembly to replace a previously damaged fastener, or simply retrying the threading of a particular fastener by one of the nutrunners 22 or 24, or replacing a broken or wrong part with a new or correct part. In the case of a fastener, a fastener can only be retried once before it is replaced with a new fastener.

The subassembly is then checked against quality control standards in step 116. If the subassembly does not meet quality control standards after completion of the bypass operation in steps 110, 112, and 114, the subassembly is submitted to repair in step 118.

However, if the subassembly, after completion of the bypass operation, meets quality control standards in step 116, the quality control data associated with the subassembly, including the ID of the authorized person who authorized the bypass operation of steps 110, 112, and 114, as well as the torque and number of retries to successfully attach a fastener to the subassembly, are associated with the subassembly number as shown in step 120. Steps 106 and 108 are then completed to attach a barcode 60 containing all of the quality control information associated with a particular subassembly number on the document 62 to the subassembly.

Figure 2:
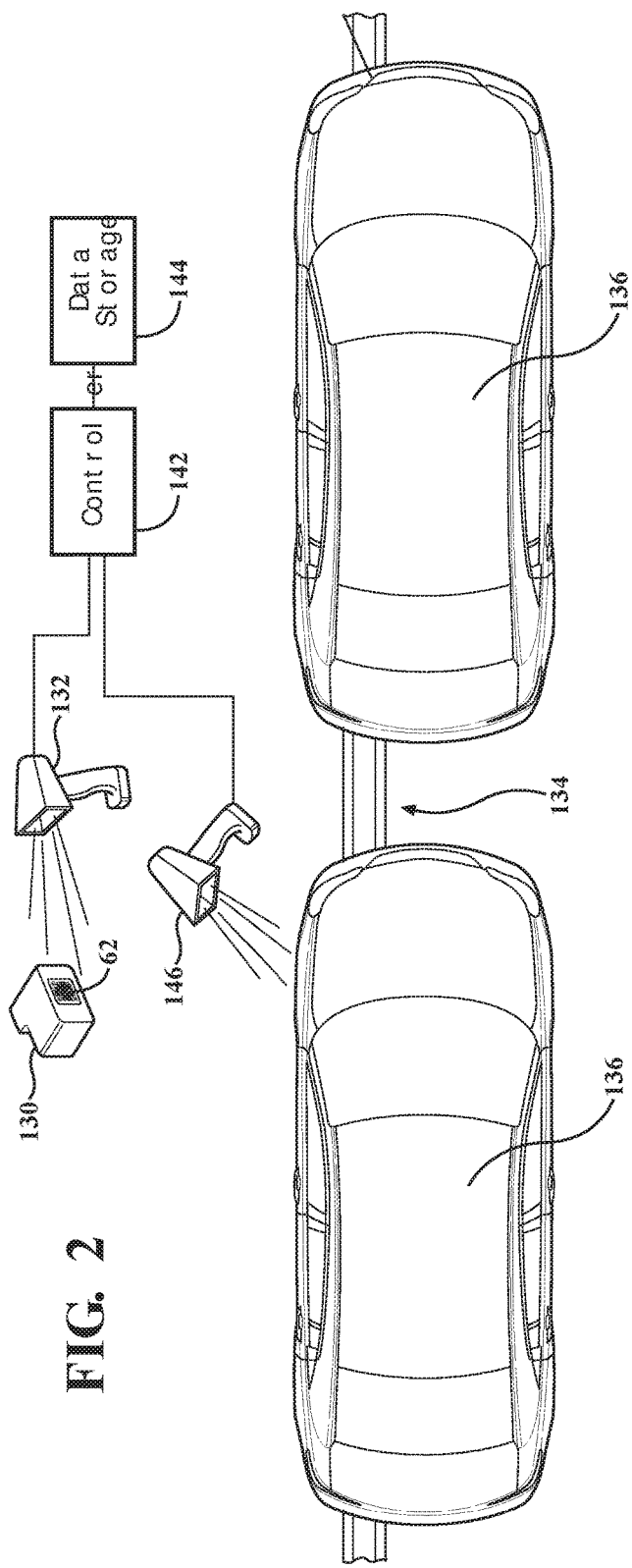
FIG. 2 is a pictorial representation of the installation of one subassembly from FIG. 1 into a main assembly.

As shown in FIG. 2, a subassembly 130, completed in the subassembly area and carrying the barcode 60 on the document 62 attached to the subassembly 130 is read by a barcode scanner or reader 132 on the main assembly line 134. Reference number 136 denotes successive product assemblies progressing down the main assembly line 134.

By example, the subassembly 130 is to be added to the main product assembly 136. At the time of installation of the subassembly 130 to the main assembly 136, a worker using a barcode scanner or reader 132 scans the barcode 60 on the document 62 as shown in step 150 of FIG. 4. The quality control data stored in the barcode 60 is transmitted by the barcode reader 132 or scanner to a main area controller 142. The main controller 142, which is coupled to data storage 144, associates the quality control data stored in the barcode 60 for the subassembly 130 with the quality control information associated with the main product assembly 136. A separate barcode scanner 146 is coupled to the area controller 142, and may be optionally employed to input quality control data printed or otherwise carried with the main product assembly 136.

In this manner, the area controller 142 associates the barcode data 60 with the main product assembly ID or identification number in step 152. In the case of an automobile, the assembly ID model or main assembly number can be a VIN number uniquely identifying the main product assembly 136 or vehicle. The recorded barcode data 60 and the assembly quality control data in assembly ID are recorded by the controller 40 in the data storage 144 as shown in step 154 of FIG. 4.

In the event of a subassembly being sent to the repair area, it can be repaired or scrapped. If repaired, the quality control data associated with the repair operation, including the fact that a repair took place, becomes part of the quality control data associated with the subassembly.

What is claimed is:

1. A method for coupling quality control data of a subassembly of components with a main product assembly, the method comprising:
   generating quality control data associated with the subassembly;
   determining that the quality control data associated with the subassembly does not match quality control standards;
   generating a hold in place action, which holds the subassembly at a work station in a locked state;
   reading an identification of an authorized person having authority to authorize a bypass operation for retrying an assembly operation, and authorizing the bypass operation;
   retrying an assembly operation of the subassembly such that the subassembly meets the quality control assembly standards;
   printing a barcode on a document, the barcode containing the quality control data associated with the subassembly;
   attaching the document including the barcode to the subassembly;
   at the time of installation of the subassembly to the main product assembly, reading the barcode on the document attached to the subassembly; and
   coupling, by a controller, the quality control data associated with the subassembly with quality control data and a unique identification of the main product assembly.

2. The method of claim 1 further comprising:
   recording the coupled quality control data of the subassembly with the unique identification of main product assembly.

3. The method of claim 1 wherein:
   the main product assembly is a vehicle; and
   the step of coupling couples the quality control data associated with the subassembly with a vehicle identification number of the vehicle.

4. The method of claim 1 further comprising:
   recording the identification of the authorized person with the quality control data associated with the subassembly.

5. The method of claim 1 further comprising:
   recording the steps occurring in the bypass operation with the quality control data associated with the subassembly.

6. The method of claim 1 further comprising:
   recording a retry operation of any assembly operation associated with the subassembly with the quality control data associated with the subassembly.

7. The method of claim 1 wherein:
   the barcode is a two dimensional barcode.

8. The method of claim 7 wherein the step of printing the barcode on a document further comprises:
   removably attaching the barcode to the subassembly.

9. The method of claim 1 further comprising:
   determining that the subassembly includes at least one fastener and the fastener does not meet quality control assembly standards,
   wherein retrying the assembly operation comprises reassembling the fastener, no more than one time, such that the subassembly meets the quality control assembly standards.

10. The method of claim 9 further comprising:
    storing the step of retrying the assembly operation associated with the fastener in the quality control data associated with the subassembly.

11. A system for associating quality control data associated with a subassembly with quality control data and unique main product assembly identification when the subassembly is installed in a main product assembly, the system comprising:
    a plurality of assembly operation stations configured for consecutively adding components to the subassembly, or for performing operations on previously added components of the subassembly; and
    a processor executing a control program and receiving inputs and generating outputs to:
      record quality control information generated during the assembly of the sub assembly;
      compare the quality control data with quality control standards;
      upon determining that the quality control data associated with the subassembly does not match quality control standards:
        generate a hold in place action, which holds the subassembly at one of the plurality of assembly operation stations in a locked state;
        read an identification of an authorized person having authority to authorize a bypass operation for retrying an assembly operation, and authorize the bypass operation;
        after a reassembly of the subassembly, determine that the subassembly meets the quality control assembly standards;
        print a two dimensional barcode on a two dimensional document, where the barcode contains the quality control information associated with subassembly;
        read the barcode on the subassembly at the time of installation of the subassembly to the main product assembly;
        associate the quality control data of the subassembly with the unique main product assembly identification; and
        store the coupled subassembly quality control data with the main product assembly identification.

12. The system of claim 11 wherein:
    the processor further executes the control program and receives inputs and generates outputs to:
    record the coupled quality control data of the subassembly with the main product assembly identification.

13. The system of claim 11 wherein:
    the main product assembly is a vehicle; and
    the processor further executes the control program and receives inputs and generates outputs to:

couple the quality control data of the subassembly with a vehicle identification number of the main product assembly.

14. The system of claim 11 further comprising:
the processor further executes the control program and receives inputs and generates outputs to:
record the identification of the authorized person with the quality control data associated with the subassembly.

15. The system of claim 11 wherein:
the barcode is a two dimensional barcode.

16. The system of claim 15 wherein:
the barcode is removably attached to the subassembly.

17. A method for coupling quality control data of a subassembly of components to a main product assembly, the method comprising:
generating quality control data associated with the subassembly;
determining that the subassembly includes at least one fastener, and the fastener does not match quality control assembly standards;
generating a hold in place action, which holds the subassembly at a work station in a locked state;
retrying an assembly operation of the fastener, no more than one time, such that the subassembly matches the quality control assembly standards;
printing a barcode on a document, the barcode containing the quality control data associated with the subassembly;
attaching the document including the barcode to the subassembly;
at the time of installation of the subassembly to the main product assembly, reading the barcode on the document attached to the subassembly; and
coupling, by a controller, the quality control data associated with the subassembly with quality control data and a unique identification of the main product assembly.

18. The method of claim 17 further comprising:
storing the step of retrying the assembly operation associated with the fastener in the quality control data associated with the subassembly.

* * * * *